(12) United States Patent
Lewis

(10) Patent No.: US 11,739,826 B2
(45) Date of Patent: Aug. 29, 2023

(54) LUBRICATION SYSTEM

(71) Applicant: AERO GEARBOX INTERNATIONAL, Colombes (FR)

(72) Inventor: Nathan Lewis, Moissy-Cramayel (FR)

(73) Assignee: AERO GEARBOX INTERNATIONAL, Colombes (FR)

( * ) Notice: Subject to any disclaimer, the term of this patent is extended or adjusted under 35 U.S.C. 154(b) by 259 days.

(21) Appl. No.: 17/343,506

(22) Filed: Jun. 9, 2021

(65) Prior Publication Data
US 2022/0049764 A1    Feb. 17, 2022

(30) Foreign Application Priority Data
Jun. 10, 2020   (FR) ...................................... 2006050

(51) Int. Cl.
  *F16H 57/04*   (2010.01)
  *F16D 3/06*    (2006.01)
  *F01D 25/18*   (2006.01)
  *F16H 57/00*   (2012.01)

(52) U.S. Cl.
  CPC ............ *F16H 57/043* (2013.01); *F16D 3/06* (2013.01); *F16D 2300/06* (2013.01); *F16H 57/0025* (2013.01)

(58) Field of Classification Search
  CPC .... F16H 57/043; F16H 57/0025; F16H 57/04; F16H 57/027; F16H 57/0434; F16H 57/0456; F16D 3/06; F16D 2300/06; F01D 25/18; F01D 5/026; F01D 15/12;
  (Continued)

(56) References Cited

U.S. PATENT DOCUMENTS 3,621,937 A * 11/1971 Edge ....................... F01D 25/18
                                                60/39.08
3,847,248 A   11/1974 Avery
(Continued)

FOREIGN PATENT DOCUMENTS

EP    2711505 A1   3/2014
FR    2543654 A1   10/1984
(Continued)

OTHER PUBLICATIONS

French Search Report in corresponding French Patent Application No. 2006050, dated Jan. 13, 2021 (9 pages).

*Primary Examiner* — Sabbir Hasan
*Assistant Examiner* — Joshua R Beebe
(74) *Attorney, Agent, or Firm* — Bookoff McAndrews, PLLC

(57) ABSTRACT

An insert for supplying a fluid within a drive shaft, the insert extending along an axis of rotation and comprising an insert wall having a rigid inner insert wall portion and an elastically deformable outer insert wall portion a reservoir defined by the insert wall for storing a fluid, a nozzle positioned at the first end of the insert wall, and wherein the elastically deformable outer insert wall portion is configured to move between an expanded state, when the fluid is supplied to the reservoir, and an unexpanded state, when rotation of the insert and supply of fluid to the reservoir are ceased, and movement of the elastically deformable outer insert wall portion to the unexpanded state forces the fluid to be discharged through the nozzle.

12 Claims, 3 Drawing Sheets

(58) Field of Classification Search
CPC ... F16N 9/02; F16N 7/363; F02C 7/06; F05D 2240/61; F05D 2240/63; F05D 2260/98
See application file for complete search history.

(56) References Cited

U.S. PATENT DOCUMENTS

| | | | |
|---|---|---|---|
| 4,493,623 A * | 1/1985 | Nelson | F04C 15/0061 417/372 |
| 4,567,784 A * | 2/1986 | Hambric | F16N 7/36 184/6.12 |
| 4,858,427 A * | 8/1989 | Provenzano | F01D 25/18 384/473 |
| 10,228,052 B2 * | 3/2019 | Slayter | F16H 57/043 |
| 10,260,615 B2 * | 4/2019 | Slayter | F16N 7/363 |
| 2015/0369355 A1 * | 12/2015 | Beier | F16H 57/045 74/468 |

FOREIGN PATENT DOCUMENTS

| | | |
|---|---|---|
| FR | 2977280 A1 | 1/2013 |
| GB | 2572585 A | 10/2019 |

\* cited by examiner

[Fig. 1]
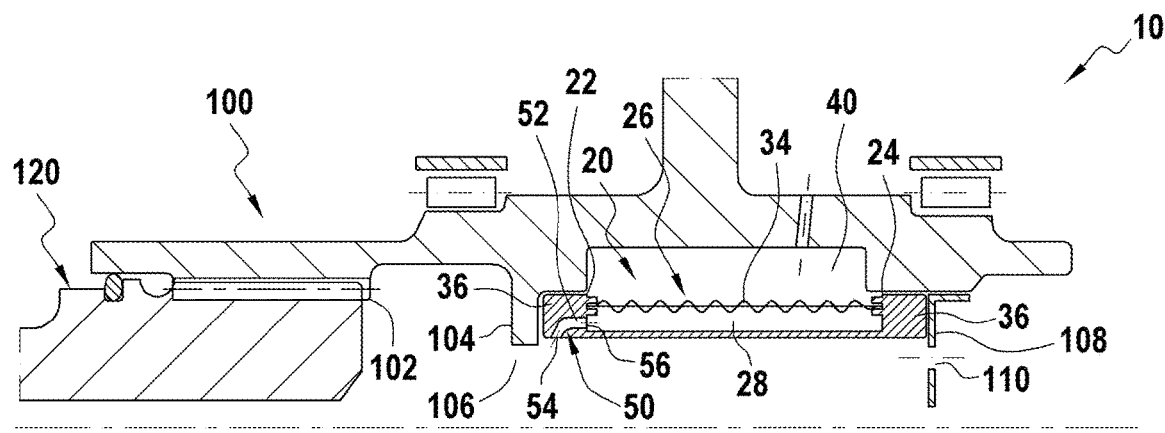
[Fig. 2]
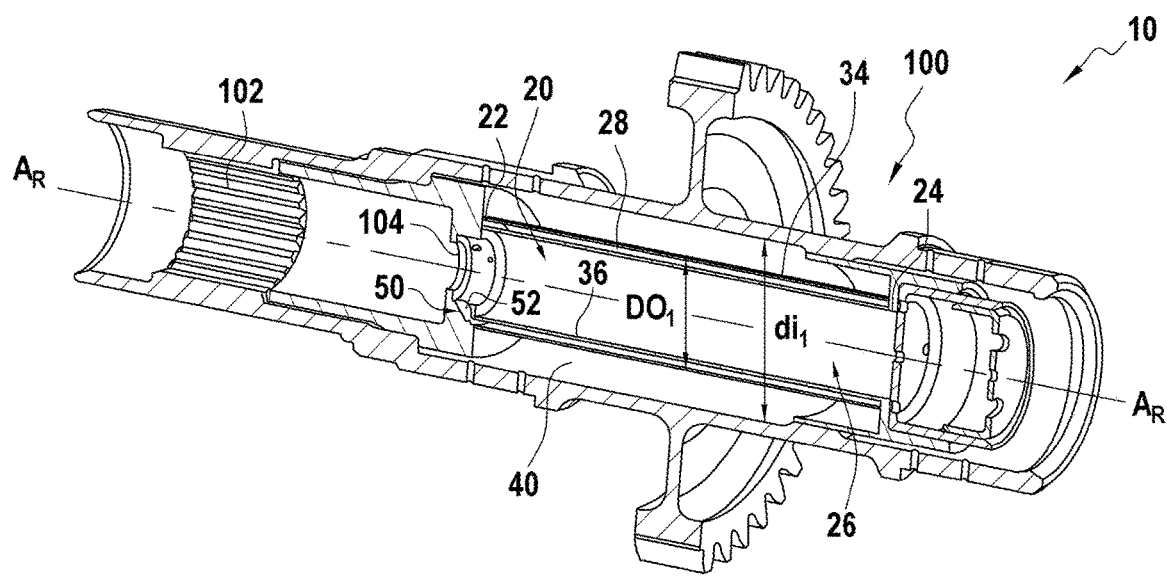

[Fig. 3]
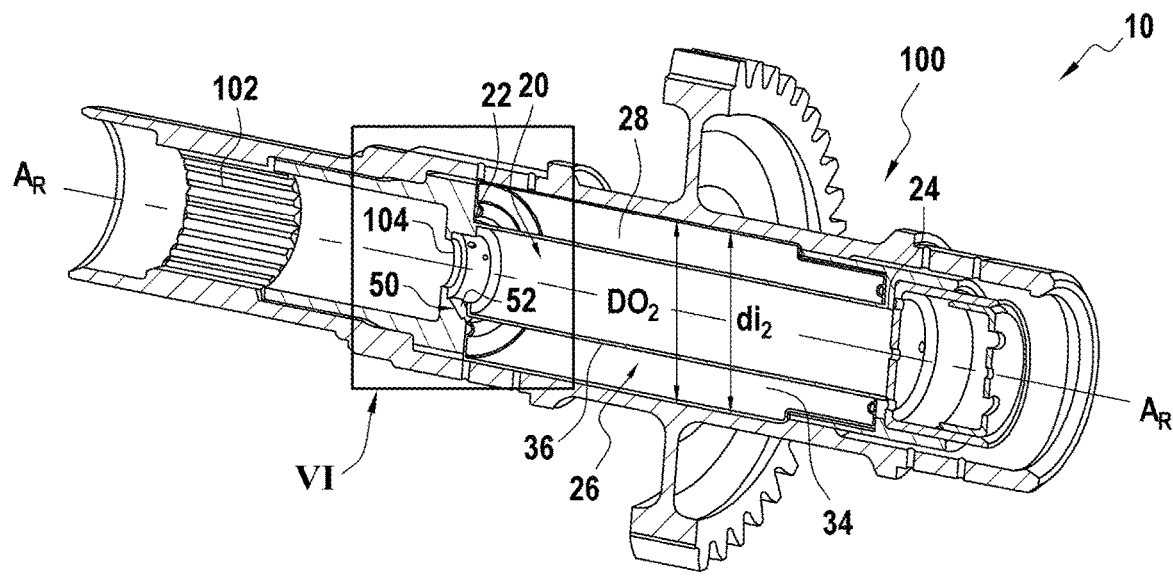
[Fig. 4]
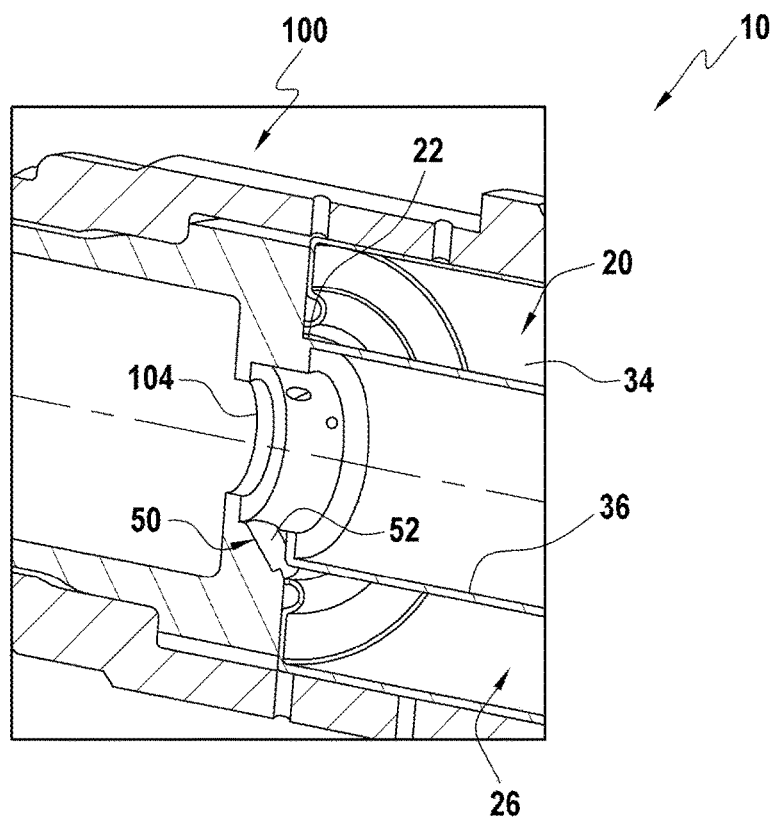

[Fig. 5A]
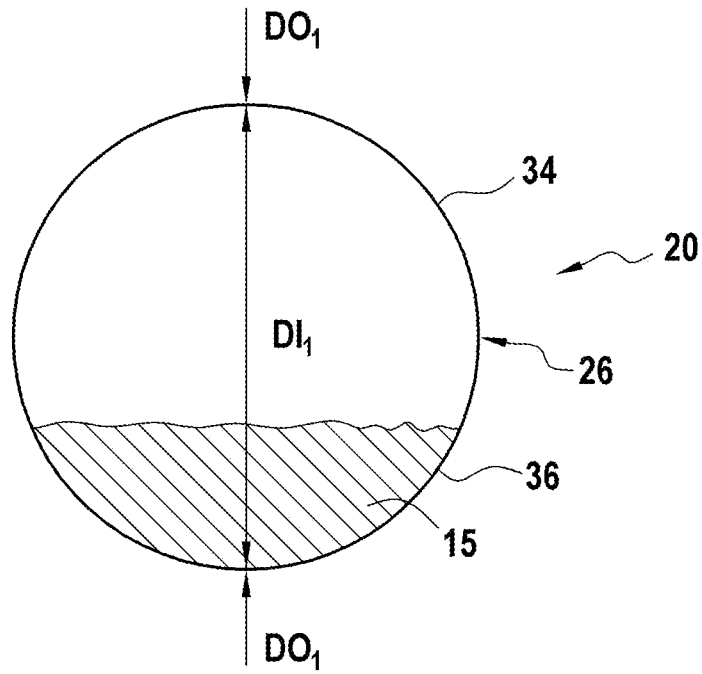
[Fig. 5B]
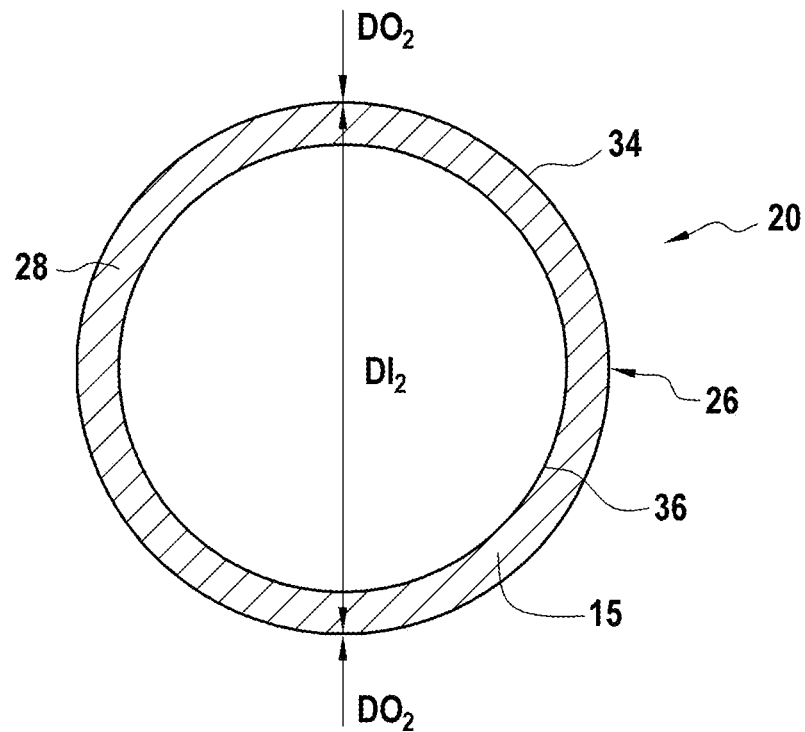

LUBRICATION SYSTEM

CROSS-REFERENCE TO RELATED APPLICATIONS

This applications claims benefit to French Patent Application No. 2006050, filed on Jun. 10, 2020, which is incorporated herein by reference in its entirety.

FIELD

The present disclosure relates generally to the field of lubrication systems within a gearbox. More specifically, the present disclosure relates to a lubrication system within a drive shaft of an accessory gearbox.

BACKGROUND

A turbine engine of an aircraft typically includes an accessory gearbox for powering mechanically driven accessory systems, such as fuel pumps, hydraulic pumps, and electrical generators, which are essential to operation of the engine and the aircraft. As is disclosed by French Patent Application FR2977280A1, the accessory gear box may usually include one or more gear trains. Each gear train may usually be made up of a plurality of gearwheels that may be driven in rotation to drive the accessories by a power transmission shaft. The power transmission shaft may be coupled to a shaft of the turbine. Each accessory may include an accessory drive shaft including one or more sets of splines which mesh with a corresponding set of splines of a corresponding gearwheel in order to be driven thereby. Additionally, the power transmission shaft may include one or more sets of splines which mesh with a corresponding set of splines of a corresponding gearwheel in order to drive the gearwheels of the gear train.

In operation, lubrication of the of the moving parts within the gearbox, such as the splines, is required in order to cool, reduce friction, and thus optimize functionality and lifetime of the gearbox. However, many currently available lubrication systems, particularly one-shot lubrication systems, are not capable of supplying an adequate amount of lubrication in order to supply lubrication to a centerline of an accessory drive shaft, and thus to another set of splines further down the accessory drive shaft and/or a mating drive shaft.

It is desirable to provide an improved system for lubricating moving parts within a gearbox which is capable of increasing the amount of lubricant supplied to moving parts within the gearbox in order to solve one or more technical problems described above.

SUMMARY

According to aspects of the disclosure an insert for supplying a fluid to splines of a drive shaft, the insert extending along an axis of rotation, and the insert comprising, an insert wall having a rigid inner insert wall portion and an elastically deformable outer insert wall portion extending between a first end and a second end of the insert along the axis of rotation, a reservoir defined by the insert wall for storing a fluid, a nozzle positioned at the first end of the insert wall, the nozzle defining a duct in communication with the reservoir, and wherein the elastically deformable outer insert wall portion is configured to move between an expanded state, when the fluid is supplied to the reservoir, and an unexpanded state, when rotation of the insert and supply of fluid to the reservoir are ceased, and movement of the elastically deformable outer insert wall portion to the unexpanded state forces the fluid to be discharged through the nozzle.

According to aspects of the disclosure, a nozzle is configured to supply the fluid to the reservoir during rotation of the insert.

According to aspects of the disclosure, the elastically deformable outer insert wall portion comprises an elastomeric material.

According to aspects of the disclosure, the rigid inner insert wall portion is bonded to the elastically deformable outer insert wall portion.

According to aspects of the disclosure, the duct extends through the rigid inner insert wall portion.

According to aspects of the disclosure, a system for supplying a fluid to splines of a drive shaft comprises a drive shaft including a set of splines and a weir positioned adjacent the set of splines, the drive shaft being configured to rotate about an axis of rotation, an insert according to any aspect described herein, the insert wall extending concentrically with the drive shaft along the axis of rotation, and wherein the nozzle is configured to discharge a jet of the fluid during cessation of rotation of the drive shaft.

According to aspects of the disclosure, the nozzle is configured to supply the fluid to the reservoir during rotation of the drive shaft.

According to aspects of the disclosure, the insert is in communication with the weir and the splines at an interface within the drive shaft.

According to aspects of the disclosure, the nozzle is configured to target the jet of the fluid through the interface and past the weir to the splines when rotation of the drive shaft is ceased.

According to aspects of the disclosure, the insert includes the elastically deformable outer insert wall portion according to any aspect described herein and has a first outside diameter in the unexpanded state and a second outside diameter in the expanded state and the first outside diameter is less than an inside diameter of the drive shaft so that a gap is defined between the insert and the drive shaft in the unexpanded state.

According to aspects of the disclosure, the insert includes the rigid inner insert wall portion according to any aspect described herein and the rigid inner insert wall portion is secured to the drive shaft to maintain position and anti-rotation of the insert within the drive shaft.

According to aspects of the disclosure, the nozzle is configured to target the jet of the fluid to the splines and toward the axis of rotation when rotation of the drive shaft is ceased.

According to aspects of the disclosure, a method of supplying fluid to splines of a drive shaft comprising steps of providing a drive shaft, the drive shaft having splines and a weir positioned adjacent the splines, providing an insert according to any aspect described above positioned within the drive shaft, the insert being separated from the splines by the weir, rotating the drive shaft, supplying fluid to the insert during rotation of the drive shaft, expanding the insert to an expanded state during rotation of the drive shaft, contracting the insert to an unexpanded state during cessation of rotation of the drive shaft, and jetting the fluid supplied to the insert past the weir to the set of splines when rotation of the drive shaft is ceased.

According to aspects of the disclosure, the step of supplying fluid to the insert includes determining an amount of fluid to be supplied dependent upon a diameter of the weir.

According to aspects of the disclosure, the step of supplying fluid to the insert includes determining an amount of fluid to be supplied dependent upon an inside diameter of the insert in the expanded state of the insert.

According to aspects of the disclosure, the step of contracting the insert includes settling the fluid within the insert to a collapsed volume of fluid.

In the manner described and according to aspects illustrated herein, the insert, the system, and the method are configured to increase an amount of fluid to be supplied to moving parts within a gearbox by producing a jet of fluid such that the fluid is supplied to a centerline of an accessory drive shaft, and thus to another set of splines further down the accessory drive shaft and/or a mating drive shaft.

BRIEF DESCRIPTION OF THE DRAWINGS

Aspects of an embodiment will be described in reference to the drawings, where like numerals reflect like elements:

FIG. 1 is a side cross-sectional view of a lubrication system for use in a gearbox (hereafter, "the system") according to aspects of the disclosure;

FIG. 2 is a side perspective view of the system of FIG. 1 showing a drive shaft of the system in cross-section and an insert of the system in partial cross-section in an unexpanded state;

FIG. 3 is a side perspective view of the system of FIG. 1 showing the drive shaft of the system in cross-section and the insert of the system in an expanded state;

FIG. 4 is an enlarged partial view taken from FIG. 3, with emphasis on a nozzle of the system;

FIG. 5A is a front cross-sectional view of the insert of the system of FIG. 1 in the unexpanded state and showing a collapsed volume of fluid; and FIG. 5B is a front cross-sectional view of the insert of the system of FIG. 1 in the expanded state and showing a spinning volume of fluid.

DETAILED DESCRIPTION

An embodiment of a lubrication system (hereafter, "the system") for use within a gearbox according to aspects of the disclosure will now be described with reference to FIGS. 1-5B, wherein like numerals represent like parts, and will generally be referred to by the reference numeral 10. Particularly, an insert 20 of the system 10 for use within a gearbox according to aspects of the disclosure will be described. Although the system 10 and the insert 20 are described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

As shown in FIGS. 1-3, the system 10 is configured for use within a drive shaft (transmission shaft) 100 of an accessory gearbox (hereafter, "the gearbox") (not shown) of an aircraft engine (not shown). However, it is contemplated that the system 10 may be configured for use within a non-accessory gearbox. Additionally or alternatively, it is contemplated that the system 10 may be configured for use within a non-aerospace application. The drive shaft 100 has a cycle of operation including a rotating state wherein the drive shaft 100 rotates about an axis of rotation $A_R$ (see FIGS. 2-3). At completion of the cycle of operation, the drive shaft 100 transitions to a resting state wherein rotation of the drive shaft 100 is ceased.

As shown in FIGS. 5A-5B, the system 10 is configured to supply a fluid 15 to one or more sets of splines 102 within the gearbox. Additionally, it is contemplated that the fluid 15 may be supplied toward the axis of rotation $A_R$. In the disclosed embodiment, the fluid 15 is a lubricant configured to cool, reduce friction, and thus optimize operation and lifetime of moving parts, such as the splines 102, within the gearbox. Referring to FIGS. 1-3, the splines 102 may be included on or within one or more of the drive shaft 100 and an accessory drive shaft 120. In the disclosed embodiment, the splines 102 are included within the drive shaft 100 and at an end of the accessory drive shaft 120. The system 10 may be configured to supply the fluid to a joint (spline joint) between the splines 102 of the drive shaft 100 and/or the splines 102 of the accessory drive shaft 120. Additionally or alternatively, the splines 102 may be included further down a centerline (center) of the accessory drive shaft 120 and/or on a mating drive shaft. A volume of the fluid 15 to be supplied to the splines 102 by the system 10 may depend upon the length of the splines 102 and/or a diameter and axial length of an area of the drive shaft 100 surrounding the splines 102 where the splines are to be bathed in the fluid 15.

As shown in FIG. 1, the drive shaft 100 may include a first weir 104 positioned within the drive shaft 100. The first weir 104 is configured to obstruct a flow of the fluid 15 from the insert 20 to the splines 102 within the drive shaft 100. The first weir 104 is positioned adjacent to and/or between the splines 102 and a first end 22 of the insert 20. Alternatively, it is contemplated that the first weir 104 may be integrally formed on the insert 20 at the first end 22 of the insert 20. In this alternative arrangement, the drive shaft 100 may include a stop configured to secure positioning of the insert 20 within the drive shaft 100. A first interface 106 may be defined between the first weir 104 and the insert 20. The drive shaft 100 may include a second weir 108 positioned within the drive shaft 100, which is configured to obstruct a flow of the fluid 15 from a supply line (not shown) to the insert 20 within the drive shaft 100. The second weir 108 is positioned adjacent to and/or between the supply line and a second end 24 of the insert 20, which is opposite the first end 22 of the insert 20. A second interface 110 may be defined between the second weir 108 and the insert 20. The insert 20 may be positioned between the first weir 104 and the second weir 108. A volume of the fluid 15 to be supplied within the system 10 may depend upon a diameter and/or height of the first weir 104 and the second weir 108. As such, changes to the diameter and/or height of the first and second weirs 104, 108 may be carried out to control a volume of the fluid 15 to be supplied within the system 10, as well as for ventilation within the system 10 to balance pressure within the system 10.

As shown in FIGS. 1-5B, the insert 20 of the system 10 is configured to supply the fluid 15 to the splines 102 of the drive shaft 100. Additionally or alternatively, the insert 20 of the system 10 is configured to supply the fluid 15 to the splines 102 of the accessory drive shaft 120 and to the centerline of the accessory drive shaft 120. The insert 20 is configured to be positioned within the drive shaft 100 and to rotate around the axis of rotation $A_R$. Rotation of the drive shaft 100 rotates the insert 20. The insert 20 includes an insert wall 26 extending along axis of rotation $A_R$. The insert wall 26 extends from the first end 22 to the second end 24 of the insert 20. In the disclosed embodiment, the insert wall 26 is cylindrical and extends concentrically within the drive shaft 100 along the axis of rotation $A_R$. Referring to FIGS. 5A-5B, the insert 20 includes a reservoir 28 defined by the insert wall 26 configured to store lubricant to supply to the splines 102.

As shown in FIGS. 1 and 4, the insert 20 includes a nozzle 50. The nozzle 50 is included at the first end 22 of the insert 20. Additionally or alternatively, the insert 20 may include more than one nozzle 50. The nozzles 50 may be arranged circumferentially at the first end 22 of the insert 20. The nozzle 50 is in communication with the first interface 106 and/or the first weir 104 and the splines 102 of the drive shaft 100, and/or the splines 102 and centerline of the accessory drive shaft 120. The nozzle 50 is also in communication with the reservoir 28 of the insert 20. Additionally, the nozzle 50 is in communication with the supply line. The nozzle 50 defines a duct 52 extending through the insert wall 26. The duct 52 extends from a first opening 54 to a second opening 56. The first opening 54 is in communication with the first interface 106 and/or the first weir 104 and the splines 102 of the drive shaft 100, and/or the splines 102 and centerline of the accessory drive shaft 120. As such, the nozzle 50 is configured to target a jet of the fluid 15 stored in the reservoir 28 through the interface 106 and past the weir 104 such that the jet of the fluid 15 is supplied to the splines 102 of the drive shaft 100, the splines 102 of the accessory drive shaft 120, and/or to the centerline of the accessory drive shaft 120. Additionally or alternatively, the first opening 54 may be at a first radial distance from the axis of rotation $A_R$ and the second opening 56 may be at a second radial distance from the axis of rotation $A_R$. It is contemplated that the differing radial distances of the first opening 54 and the second opening 56 allow the nozzle 50 to improve targeting of the jet of the fluid 15. The second opening 56 is in communication with the reservoir 28. Additionally, the first opening 54 is in communication with the supply line. As such, the nozzle 50 is also configured to be an inlet and/or to supply the fluid 15 to the reservoir 28 of the insert 20. Additionally or alternatively, it is contemplated that the insert 20 may include an inlet separate from the nozzle 50. In this alternative arrangement, the inlet includes a one-way valve, such that the fluid 15 may be supplied to the reservoir 28 through the inlet but cannot be discharged from the reservoir 28 through the inlet.

As illustrated by FIGS. 2-3, the insert 20 is configured to transition between an expanded state and an unexpanded state (the unexpanded state may also be referred to herein as a "contracted state"). The expanded state increases the diameter of the insert 20 to allow the insert 20 to receive a greater volume of the fluid 15 for supplying to the splines 102. The system 10 is configured to only supply the fluid 15 to the splines 102 during the resting state in order to protect the fluid supply line from depletion. The unexpanded state decreases the diameter of the insert 20 to allow the fluid 15 to reach a sufficient height within the insert 20 to be supplied to the splines 102. To this end, the insert wall 26 includes an elastically deformable portion (the "elastically deformable portion" may also be referred to herein as an "elastically deformable outer insert wall portion") 34 which is capable of transitioning between the expanded state and the unexpanded state. In the disclosed embodiment, the elastically deformable portion 34 is constructed of an elastomeric material. The elastically deformable portion 34 extends between the first end 22 and the second end 24 of the insert. The elastically deformable portion 34 may extend from the first end 22 to the second end 24 of the insert 20. The elastically deformable portion 34 may reduce the weight of the system 10.

During the cycle of operation, the elastically deformable portion 34, and thus the insert 20, is configured to expand to the expanded state during the rotating state of the drive shaft 100. During the rotating state 100, a spinning volume of the fluid 15 within the reservoir 28 of the insert 20 forms a toroidal shape due to a centrifugal effect generated by rotation of the drive shaft 100 (see FIG. 5B). The elastically deformable portion 34 expands during the rotating state of the drive shaft 100 due to a centrifugal force exerted on the elastically deformable portion 34 by the spinning volume of the fluid 15 during rotation of the drive shaft 100 (see FIG. 3). In the disclosed embodiment, the elastically deformable portion 34 may be capable of expansion at a threshold rotational speed of the drive shaft 100 in a range between 10% of engine idle speed and engine idle speed. At completion of the cycle of operation, the elastically deformable portion 34, and thus the insert 20, is configured to contract to the unexpanded state during cessation of rotation of the drive shaft 100 (see FIG. 2). It is contemplated that the term "cessation of rotation" as used herein may be understood to mean a period in which rotation of the drive shaft 100 slows to the resting state of the drive shaft 100. The elastically deformable portion 34 may also be configured to contract to the unexpanded state when rotation of the drive shaft 100 is ceased and/or stopped. In the disclosed embodiment, the elastically deformable portion 34 may be capable of contraction at a threshold rotational speed of the drive shaft 100 in a range between 50% of engine idle speed and 0 RPM, but most preferably below 10% of engine idle speed. During the resting state, the fluid 15 within the reservoir 28 of the insert 20 may settle to a collapsed volume of the fluid 15 having a height sufficient to reach the splines 102 (see FIG. 5A). However, contraction of the elastically deformable portion 34 and/or relief of a centrifugal pressure within the insert 20 primarily cause the fluid 15 to jet out of the nozzle 50 toward the splines 102 and/or the centerline of the accessory drive shaft 120.

As shown in FIGS. 5A-5B, in the unexpanded state, the elastically deformable portion 34 of the insert 20 has a first inside diameter $DI_1$ and a first outside diameter $DO_1$. In the expanded state, the insert 20 has a second inside diameter $DI_2$ and a second outside diameter $DO_2$. In the disclosed embodiment, the first inside diameter $DI_1$ and the first outside diameter $DO_1$ may be a substantially smaller fraction of the second inside diameter $DI_2$ and the second outside diameter $DO_2$. As shown in FIGS. 2-3, the drive shaft 100 has an inside diameter $di_1$. In the disclosed embodiment, the first outside diameter $DO_1$ of the insert is a fraction of the inside diameter $di_1$ of the drive shaft 100. Additionally, the second outside diameter $DO_2$ of the elastically deformable portion 34 of the insert 20 is equivalent, or substantially equivalent, to the inside diameter $di_1$ of the drive shaft 100. The difference between the first outside diameter $DO_1$ of the insert 20 and the inside diameter $di_1$ of the drive shaft 100 allows for a gap 40 to be defined between the insert 20 and the drive shaft 100 when the insert 20 is in the unexpanded state. The gap 40 allows room for the insert to transition from the unexpanded state to the expanded state. The negligible difference between the second outside diameter $DO_2$ of the insert 20 and the inside diameter $di_1$ of the drive shaft 100 must be so to allow the insert 20 to conform to the inside diameter $di_1$ of the drive shaft 100 without damaging the elastically deformable portion 34 of the insert 20.

Positioning of the insert 20 within the drive shaft 100 is configured to be maintained during the rotating state and the resting state. As shown in FIG. 1, the insert wall 26 may also include a rigid portion (the "rigid portion" may also be referred to herein as a "rigid inner insert wall portion") 36. The rigid portion 36 extends between the first end 22 and the second end 24 of the insert 20. The rigid portion 36 may extend from the first end 22 to the second end 24 of the insert 20. The rigid portion 36 is configured to be oriented within the elastically deformable portion 34 and to extend concentrically with the elastically deformable portion 34. The reservoir 28 is defined between the rigid portion 36 and the elastically deformable portion 34. The duct 52 extends through the rigid portion 36 at or adjacent to the first end 22. The rigid portion 36 may be bonded to the elastically deformable portion 34. Additionally, the rigid portion 36 may be interference fit and/or press-fit within the drive shaft 100 to maintain position and anti-rotation of the insert 20 within the drive shaft 100. However, it is contemplated that a person having ordinary skill in the art would appreciate that the rigid portion 36 may be secured within the drive shaft 100 by other configurations, such as threading, bonding, or adhesion within the drive shaft 100. In the disclosed embodiment, the rigid portion 36 is constructed of steel or aluminum, but it is contemplated that a person having ordinary skill in the art would appreciate that the rigid portion 36 may be constructed of any other rigid material which may be compatible with the insert 20.

In operation, the drive shaft 100 transitions from the resting state to the rotating state. The insert 20 is configured to be supplied with the fluid 15 through the nozzle 50 during the rotating state and to supply fluid to the splines 102 through the nozzle 50 during the resting state. During rotation, the fluid 15 is supplied from the supply line to the insert 20. The fluid 15 enters the insert 20 through the first opening 54 of the nozzle 50, travels through the duct 52, and enters the reservoir 28 through the second opening 56 of the nozzle 50. During rotation of the drive shaft 100, the fluid 15 forms the spinning volume within the insert 20 and applies the centrifugal force on the elastically deformable portion 34. The elastically deformable portion 34 expands from the unexpanded state to the expanded state. In the expanded state, the diameter $DI_2$, $DO_2$ of the elastically deformable portion 34 of the insert 20 is increased, thereby increasing the volume of the reservoir 28 of the insert 20. The amount of fluid 15 to be supplied to the insert 20 may be dependent upon the second inside diameter $DO_2$ of the insert 20 in the expanded state. As such, the increased diameter $DI_2$, $DO_2$ of the insert 20, and thus the increased volume of the insert 20, allows the insert 20 to receive a greater volume of the fluid 15 for the system 10 to supply in a jet of the fluid 15 to the splines 102 of the drive shaft 100 and the splines 102 of the accessory drive shaft 120. Additionally, the greater volume of fluid 15 allows the system 10 to supply the jet of the fluid 15 to the centerline of the accessory drive shaft 120. As such, the greater volume of the jet of the fluid 15 also allows the system 10 to supply fluid to other splines 102 which may be present further down on the accessory drive shaft 120.

At completion of the cycle of operation, the drive shaft 100 transitions from the rotating state to the resting state. In the resting state and/or during cessation of rotation, the fluid 15 is no longer supplied from the supply line to the insert 20. During cessation of rotation of the drive shaft 100 and/or when rotation of the drive shaft 100 ceases, the elastically deformable portion 34 contracts from the expanded state to the unexpanded state and the spinning volume of fluid 15 settles to the collapsed volume of fluid 15. Contraction of the elastically deformable portion 34 and/or relief of centrifugal pressure within the insert 20 cause the fluid 15 to jet out of the nozzle 50 toward the splines 102. The jet of the fluid 15 is capable of traveling longer distances, with higher momentum, without dissipating—in contrast to the fluid 15 splashing or spilling out of the insert 20. The nozzle 50 is configured to target the jet of the fluid 15 toward specific areas within the drive shaft 100. The jet of the fluid 15 is discharged through the first interface 106 and past the first weir 104 to the splines 102 of the drive shaft 100, the splines 102 of the accessory drive shaft 120, and/or the centerline of the accessory drive shaft 120. Due to the increased volume of the fluid 15 within the reservoir 28 of the insert 20, and a stronger, targeted flow of the fluid 15 due to the fluid 15 jetting from the nozzle 50, the fluid 15 supplied to the centerline of the accessory drive shaft 120 also reaches other splines 102 which may be present further down on the accessory drive shaft 120.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

The invention claimed is:

1. An insert for supplying a fluid to splines of a drive shaft, the insert extending along an axis of rotation, the insert comprising:
    an insert wall having a rigid inner insert wall portion and an elastically deformable outer insert wall portion extending between a first end and a second end of the insert along the axis of rotation;
    a reservoir defined by the insert wall for storing a fluid;
    a nozzle positioned at the first end of the insert wall, the nozzle defining a duct in communication with the reservoir; and
    wherein, the elastically deformable outer insert wall portion is configured to move between an expanded state, when the fluid is supplied to the reservoir, and an unexpanded state, when rotation of the insert and supply of fluid to the reservoir are ceased, and movement of the elastically deformable outer insert wall portion to the unexpanded state forces the fluid to be discharged through the nozzle.

2. The insert of claim 1, wherein the nozzle is configured to supply the fluid to the reservoir during rotation of the insert.

3. The insert of claim 1, wherein the elastically deformable outer insert wall portion comprises an elastomeric material.

4. The insert of claim 1, wherein the rigid inner insert wall portion is bonded to the elastically deformable outer insert wall portion.

5. The insert of claim 1, wherein the duct extends through the rigid inner insert wall portion.

6. A system for supplying a fluid to splines of a drive shaft, the system comprising:
    a drive shaft including splines and a weir positioned adjacent the splines, the drive shaft configured to rotate about an axis of rotation;
    an insert according to claim 1, the insert wall extending concentrically with the drive shaft along the axis of rotation; and
    wherein, the nozzle is configured to discharge a jet of the fluid during cessation of rotation of the drive shaft.

7. The system of claim 6, wherein the nozzle is configured to supply the fluid to the reservoir during rotation of the drive shaft.

8. The system of claim 6, wherein the insert is in communication with the weir and the splines at an interface within the drive shaft.

9. The system of claim 8, wherein the nozzle is configured to target the jet of the fluid through the interface and past the weir to the splines when rotation of the drive shaft is ceased.

10. The system of claim 6, wherein the insert has a first outside diameter in the unexpanded state and a second outside diameter in the expanded state and the first outside diameter is less than an inside diameter of the drive shaft so that a gap is defined between the insert and the drive shaft in the unexpanded state.

11. The system of claim 6, wherein the rigid inner insert wall portion is secured to the drive shaft to maintain position and anti-rotation of the insert within the drive shaft.

12. The system of claim 6, wherein the nozzle is configured to target the jet of the fluid to the splines and toward the axis of rotation when rotation of the drive shaft is ceased.

* * * * *